United States Patent
Grahn et al.

[11] Patent Number: 5,924,667
[45] Date of Patent: Jul. 20, 1999

[54] POSITIONING DEVICE

[76] Inventors: Craig Grahn, 310 W. Lido Prom, Lindenhurst, L.I., N.Y. 11757; Gregory Zeccardi, R.D. 23 E. Brook Rd., Box 55B, Walton, N.Y. 13856

[21] Appl. No.: 08/848,804

[22] Filed: May 1, 1997

[51] Int. Cl.⁶ .................................................. F16B 45/00
[52] U.S. Cl. ............................................ 248/304; 248/690
[58] Field of Search .................................... 248/304, 339, 248/340, 690

[56] References Cited

U.S. PATENT DOCUMENTS

| | | | |
|---|---|---|---|
| 645,057 | 3/1900 | Ayers et al. | 248/613 |
| 1,510,978 | 10/1924 | Conklin | 248/339 |
| 1,824,941 | 9/1931 | Winder | 248/339 |
| 3,139,260 | 6/1964 | Hamel | 248/340 |
| 4,015,112 | 3/1977 | Castaldo | 362/155 |
| 4,678,153 | 7/1987 | Maddock et al. | 248/229 |
| 4,872,633 | 10/1989 | Sullivan | 248/340 |
| 4,885,667 | 12/1989 | Selden | 362/253 |
| 5,163,751 | 11/1992 | Bottiglieri | 362/376 |
| 5,243,505 | 9/1993 | Carr | 362/275 |
| 5,448,463 | 9/1995 | Leen | 362/396 |

*Primary Examiner*—Ramon O. Ramirez
*Assistant Examiner*—Robert Lipcsik

[57] ABSTRACT

A positioning device for holding a wide variety of items such as a trouble light or a flower pot. A block has a rod mounted to be slidable in it and the rod has a bar mounted on one end at right angles to the rod. The block has a indentation with grooves to secure the bar, the groove selected determining the position of the rod. A spring mounted about the rod between a clip on the rod and the mounting block retains the bar in the groove selected. The rod has a threaded end onto which a coupling is mounted and fastening means of various configurations are secured to the coupling. A bracket may be used to hold the mounting block.

10 Claims, 8 Drawing Sheets

POSITIONING DEVICE

BACKGROUND OF THE INVENTION

1. Field of the Invention

This invention relates to a positioning device and more particularly to a positioning device for use with a large variety of objects which need to be supported and rotated to an adjustable, fixed position and may be affixed directly to the object to be supported or may be used in conjunction with a bracket to provide a fastening device from which a variety of items may be suspended.

2. Description of the Prior Art

The need both temporarily and permanently to suspend and position various items is well known. One of the most classic examples is a trouble lamp, sometimes called a drop light, which needs to be temporarily suspended with virtually every usage. The Bottiglieri Patent, U.S. Pat. No. 5,163,751 addressed this problem. However, among other differences, Bottiglieri provided an improvment specific to a trouble light and the design of Bottiglieri uses the trouble light itself as part of the positioning equipment while this invention may be used in an endless variety of applications by merely affixing the device to the item. The invention includes a bracket as an additional feature of the invention and which makes the invention particularly desirable for hanging objects, such as a plant, which needs to be turned periodically to provide proper sun light. The positioning device can thus be secured either directly to the item to be positioned or can be affixed to a bracket so that the item is then attached to the positioning device.

Accordingly, it is an object of the present invention to provide a positioning device which can be mounted on a wide variety of items for many different applications.

Accordingly, it is another object of the present invention to provide a positioning device, including a bracket, on which the positioning device may be mounted to provide a fastening means which can be positioned to suspend a variety of items.

Accordingly, it is another object of the present invention to provide a positioning device which is economical to construct.

Accordingly, it is another object of the present invention to provide a positioning device which is durable.

Accordingly, it is another object of the present invention to provide a positioning which can easily be mounted on an item or mounted on a bracket which also is easily installed.

Other objects and advantages of the present invention will become apparent to those of ordinary skill in the art as the description there of proceeds.

SUMMARY OF THE INVENTION

A positioning device is provided which includes a block with an indentation. A rod is mounted in the block so as to be slidable and rotatable. A bar is located across one end of the rod and is located in the indentation. Grooves in the block permit temporary retention of the bar. A spring is mounted about the rod above the block and is compressed against the block by a clip affixed on the rod. At the other end of the rod, above the clip, the rod is threaded and a coupling is secured to the rod by a thread and a wide selection of fastening means may be attached to the coupling to permit proper positioning of the item in issue in the place desired.

DESCRIPTION OF THE DRAWINGS

The invention may be more readily understood by referring to the accompanying drawings, in which.

DESCRIPTION OF THE PREFERRED EMBODIMENT

Figure 1:
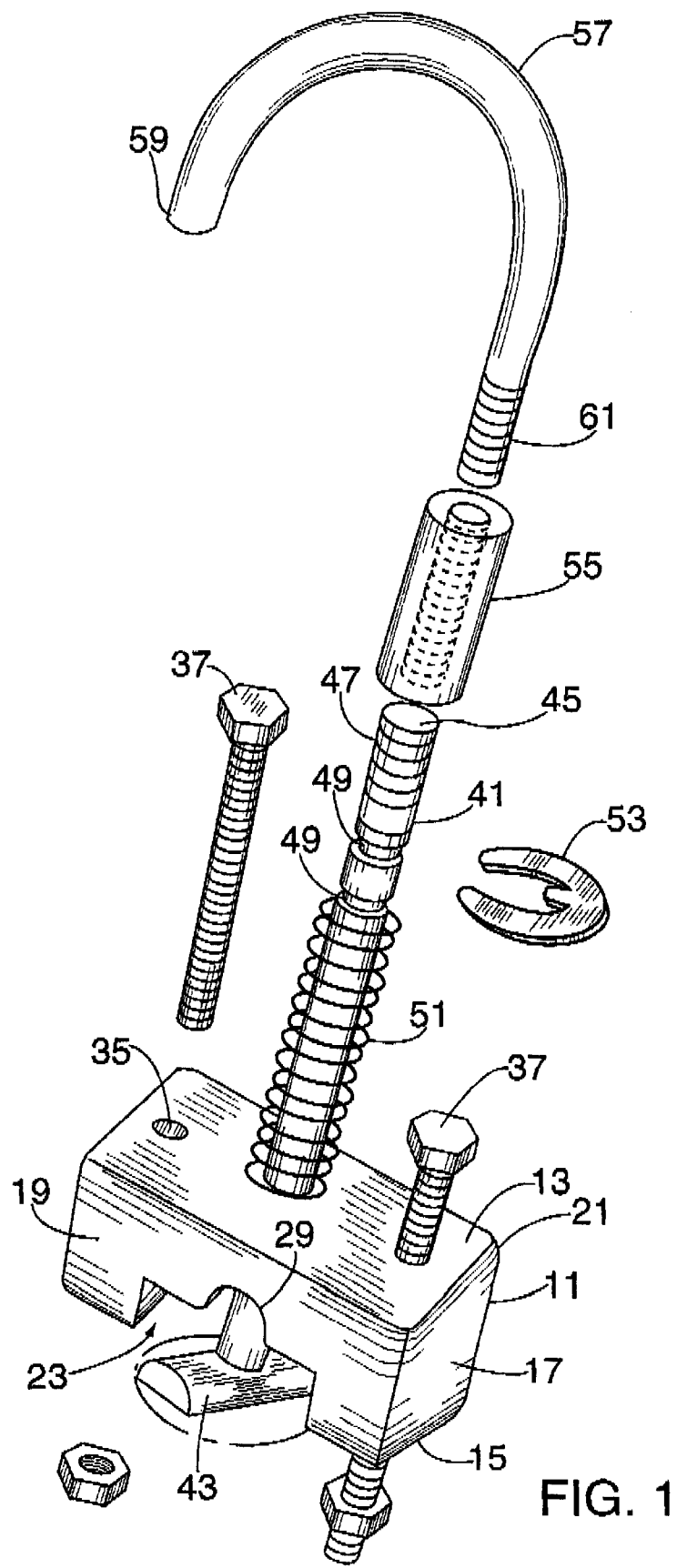
FIG. 1 is perspective view of the positioning device showing the block with the indentation and the rod along with the spring about the rod with the clip to hold the spring and also showing the coupling and fastening means.

Referring to FIG. 1, a block 11 is shown having a top surface 13, a bottom surface 15, two end surfaces 17, a front surface 19 and a rear surface 21. The bottom surface 15 is sloped in relation to the top surface 13 to facilitate mounting of the block 11 on a sloping surface. In the bottom surface 15, extending from the front surface 19 to the rear surface 21, there is an indentation 23. The indentation 23 has a generally rectangular configuration and is generally located centrally between the two end surfaces 17. The indentation 23 has an inner surface 25, generally parallel to the top surface 13 and two side surfaces 27 both of which are generally parallel to both end surfaces 17.

Figure 2:
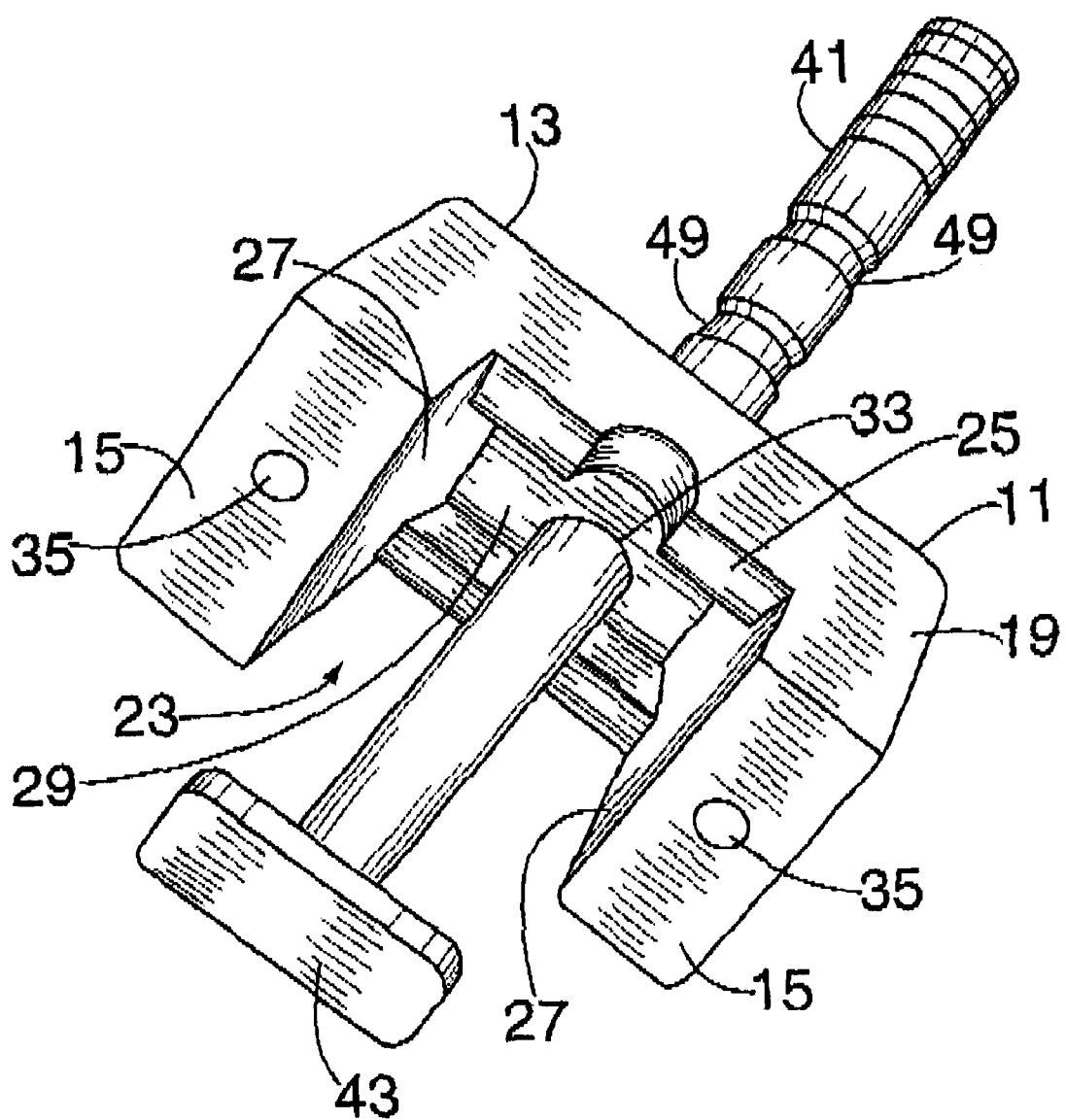
FIG. 2 is a perspective view of the underside of the block showing the interior of the indentation.
Figure 5:
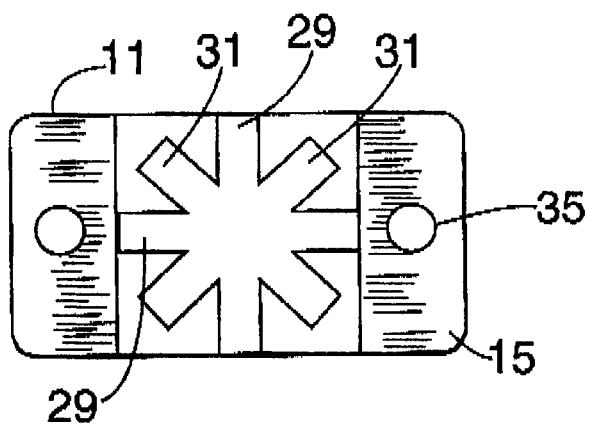
FIG. 5 is an plan view of the base of the block and showing an alternate four groove design rather than two groove design shown in FIG. 2.

As best seen in FIG. 2, a pair of grooves 29 are located in the inner surface 25 and the grooves 29 are generally at right angles to one another, one being generally parallel to the front surface 19 and rear surface 21 and the other being generally parallel to the two end surfaces 17. As best seen in FIG. 5, an additional two grooves 31 can be placed in the inner surface 25 rather than just the two grooves 29 shown in FIG. 2, thereby providing a position every forty-five degrees rather than every ninety degrees.

As seen in FIG. 1 and FIG. 2, the block 11 has an opening 33 extending from the top surface 13 into the indentation 23 at the point where the grooves 29,31 cross one another. This is also generally the center point of both the top surface 13 and the inner surface 25, midway between the two end surfaces 17 and the front surface 19 and rear surface 21.

Two holes 35 are also located equidistant on opposite sides of the opening 33 midway between the front surface 19 and the rear surface 21 and adjacent the two end surfaces 17.

Figure 9:
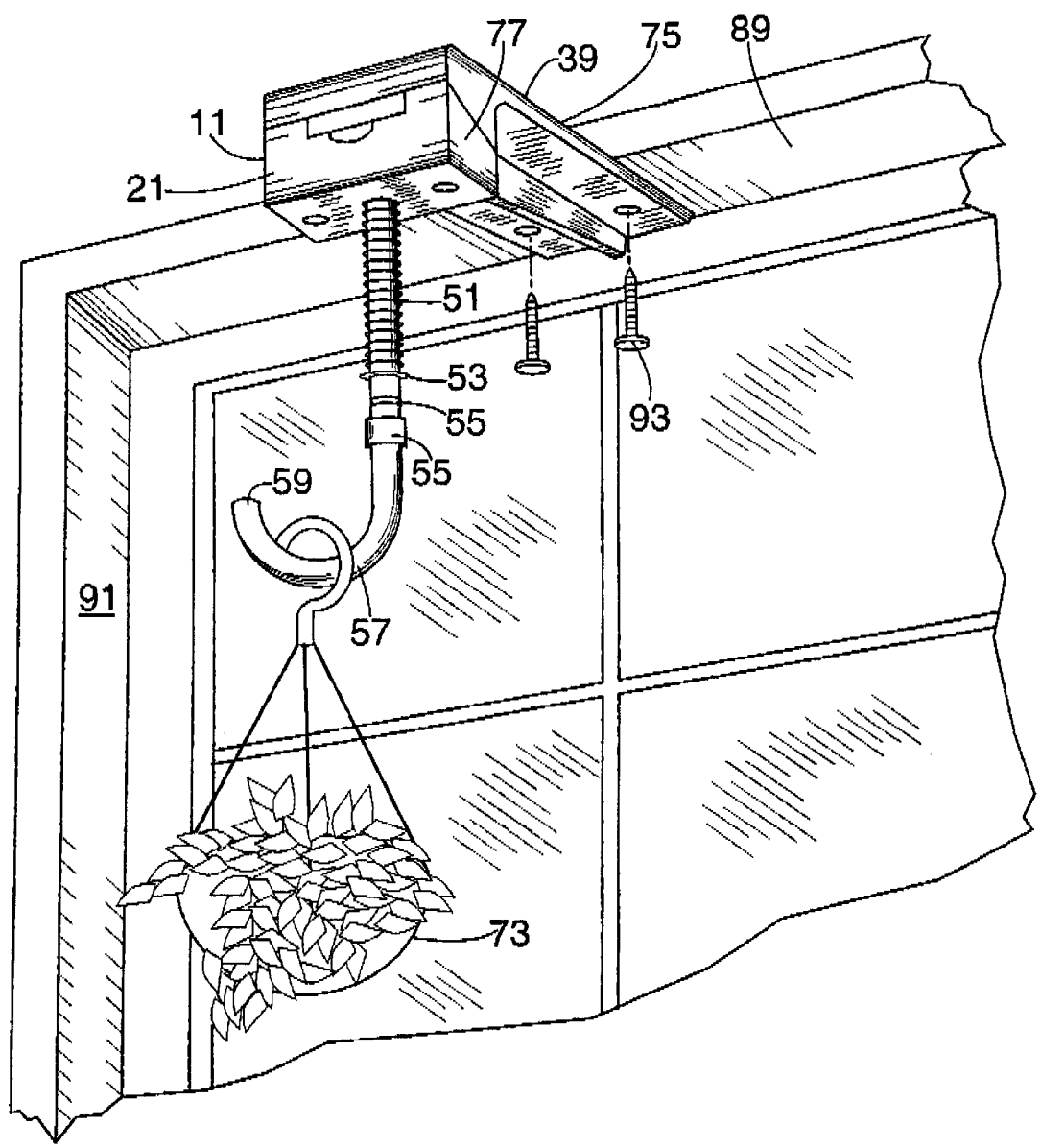
FIG. 9 is a perspective view showing the bracket mounted in the top of a window frame with the positioning device affixed to it and a plant suspended from the positioning device.
Figure 10:
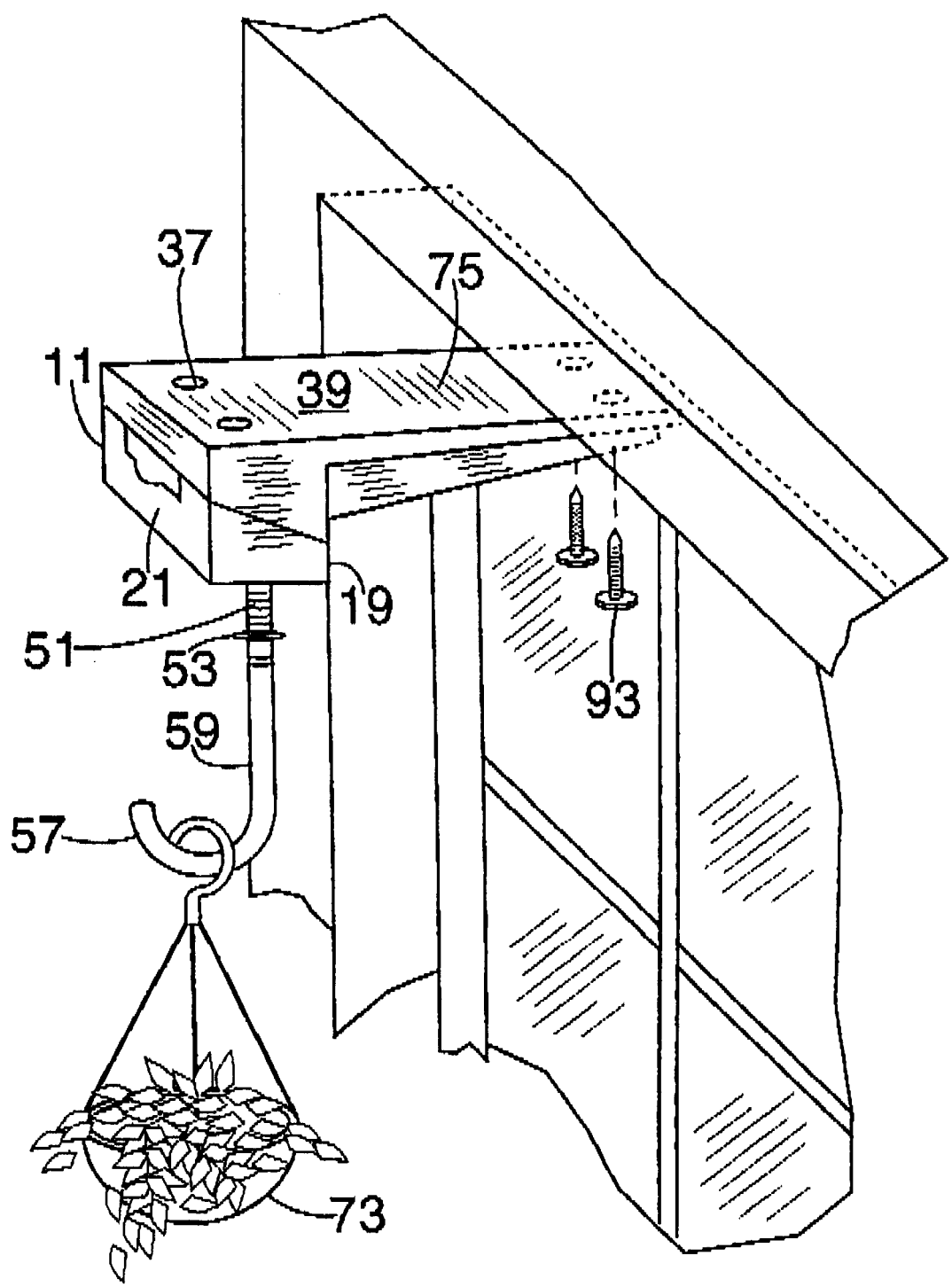
FIG. 10 is a perspective view similar to FIG. 9 but looking down on the bracket.

The two holes 35 are used for fasteners 37, such as machine bolts as shown in FIG. 2, to secure the block 11 to whatever item is to be used with the positioning device or to a bracket 39 as shown in FIG. 9 and FIG. 10. Screws may also be used as the fasteners 37 particularly when the positioning device is screwed directly to the item to be mounted.

A rod 41 is used in conjunction with the block 11 and is fitted into the opening 33 to rotate and slide therein. One end of the rod 41 extends into the indentation 23 and at the end of the rod 41 within the indentation 23 there is a bar 43 rigidly mounted on the rod 41 generally at right angles to the rod 41. The bar 43 extends generally an equal distance on both sides of the rod 41. The grooves 29,31 on the inner surface 25 have a generally semicircular cross section and the bar 43 has the same semicircular cross section so that the bar 43 fits comfortably into each of the grooves 29 and is secure there unless pressed down and thus out of the grooves 29,31. The opposite end 45 of the rod 41 extends through the block 11 and above the top surface 13. The end 45 of the rod 41 beyond the top surface 13 has a thread 47 on it and below the thread 47 there are two spaced slots 49. A spring 51, which is a coil spring, is placed over the rod 41 and a clip 53, as seen in FIG. 1, is inserted into one of the slots 49. The spring 51 extends between the top surface 13 of the block 11 and the clip 53. Regardless of which slot 49 is used to hold the clip 53, the spring 53 is placed under compression to force the bar 43 into one of the grooves 29,31 selected and holds the bar 43 there. The force of the spring 51 holds the bar 43 in place until pressure is placed on the rod 41 against the spring 51 and the bar 43 is forced out of whatever groove 29,31 it is in and may then be turned to be placed in another one of the grooves 29,31. The slot 49 closest to the top surface 13 provides the greatest force to secure the bar 43 in place.

The thread 49 on the rod 41 permits attachment of a coupling 55. To the coupling 55 may be attached any number of fastening means 57 which must be threaded to be connected to the coupling 55. In FIG. 1, a hook 59 is shown as the fastening means and, as stated, the hook 59 has a thread 61 to secure it into the coupling 55.

Figure 7:
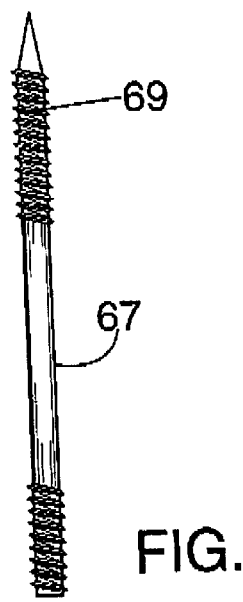
FIG. 7 is a side elevation of a fastening means used to hold the positioning device directly into a support.
Figure 8:
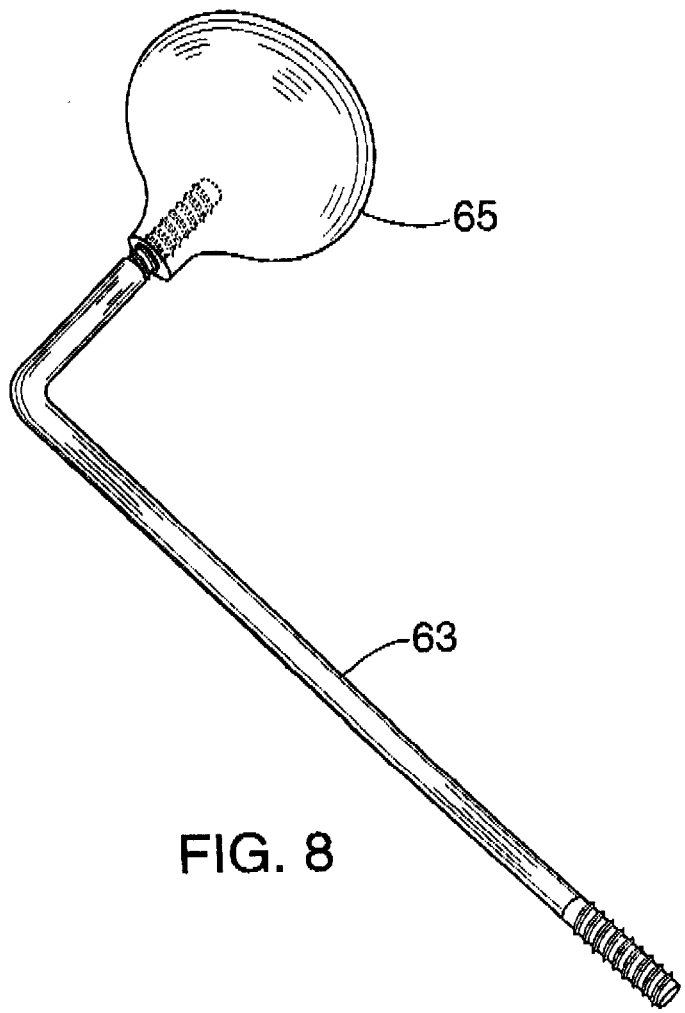
FIG. 8 is a perspective view of a fastening means including an L-shaped rod with a suction cup secured on one end and with the other end threaded to be secured to the coupling.

In FIG. 8, a fastening means 57 is shown, also with the required thread 61, which includes an L-shaped rod 63 with a suction cup 65 on the short end of the L-shaped rod 63, the other end of which may be secured to the coupling 55. In FIG. 7, a lag screw 67 is shown, as the fastening means 57 with a screw end 69, which permits turning the screw end 69 into a part of a structure and connecting the thread 61 at the other end to the coupling 55.

Figure 6:
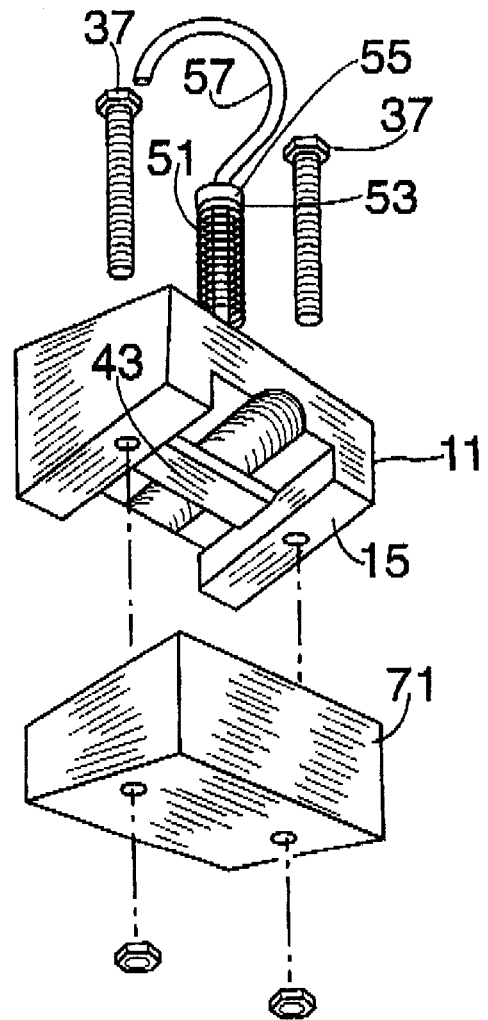
FIG. 6 is a perspective view of the Positioning Device with a wedge used to mount the block on surfaces having a slope inconsistent with the bottom surface of the block.

As best seen in FIG. 6, a wedge 71 may be used with the block 11 and placed between the bottom surface 15 of the block 11 and the item upon which the positioning device is mounted. In this way, the block 11 can be mounted on a flat surface area (not shown) so as to be perpendicular to the flat surface area, despite the slope of the bottom surface 15.

Figure 3:
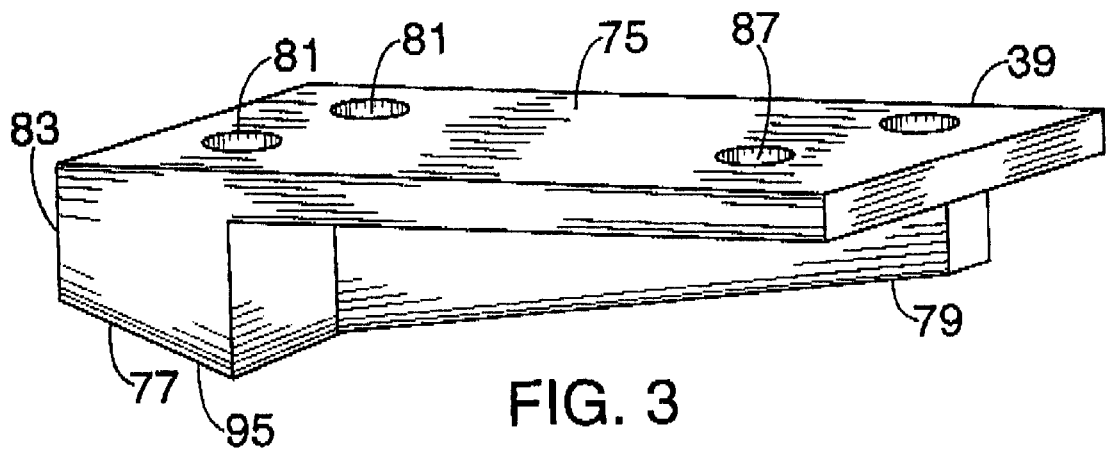
FIG. 3 is a perspective view of a bracket used with the positioning device showing the top and side of the bracket.
Figure 4:
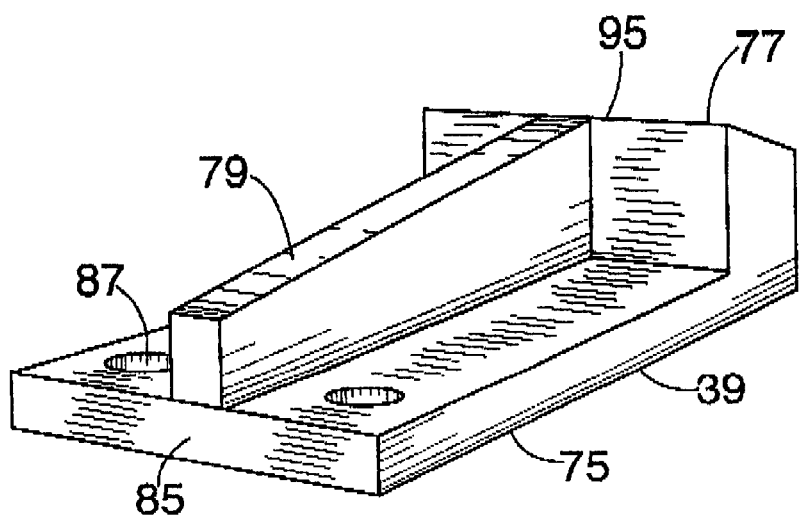
FIG. 4 is a perspective view of the bracket showing the end and the underside of the bracket.

As best seen in FIG. 3 and FIG. 4, the bracket 39 may be used with the positioning device, for specific applications such as hanging a plant 73. The bracket 39 includes a plate 75 and a mounting member 77 located generally a right angles to the plate 75 at one end of the plate 75. A reinforcing member 79 extends along the plate 75 to the mounting member 77. One pair of holes 81 extends through the plate 75 and the mounting member 77, at the mounting end 83 of the bracket 39, and at the opposite end of the plate 75, the fastening end 85, another set of holes 87 extends through the plate 75. The bracket 39 can be secured to various parts of a structure but one example would be the top interior 89 a window frame 91. As best seen in FIG. 9 and FIG. 10, the fastening end 85 of the plate 75 is secured by means of screws 93 through the holes 87 at the fastening end 85 of the plate 75 to the underside of the top interior member 89 of the window frame 91 and the block 11 is secured to the mounting member 77. The bracket 39 extends inside the window frame 91. The mounting member 77 has a mounting surface 95 which is sloped to coincide with the slope of the bottom surface 15 of the block 11. The fasteners 37, shown as bolts, are placed through the mounting member 77 and the block 11 and the positioning device is now located with the fastening means 57 below the block 11 and a wide variety of items may be hung from the fastening means 57 but the plant 73, as shown in FIG. 9 and FIG. 10, is one very desirable application. In this way, the plant 73 is located directly inside the window frame 91 and the plant 73 can be turned regularly to achieve sunlight on a different portion of the plant 73.

Figure 11:
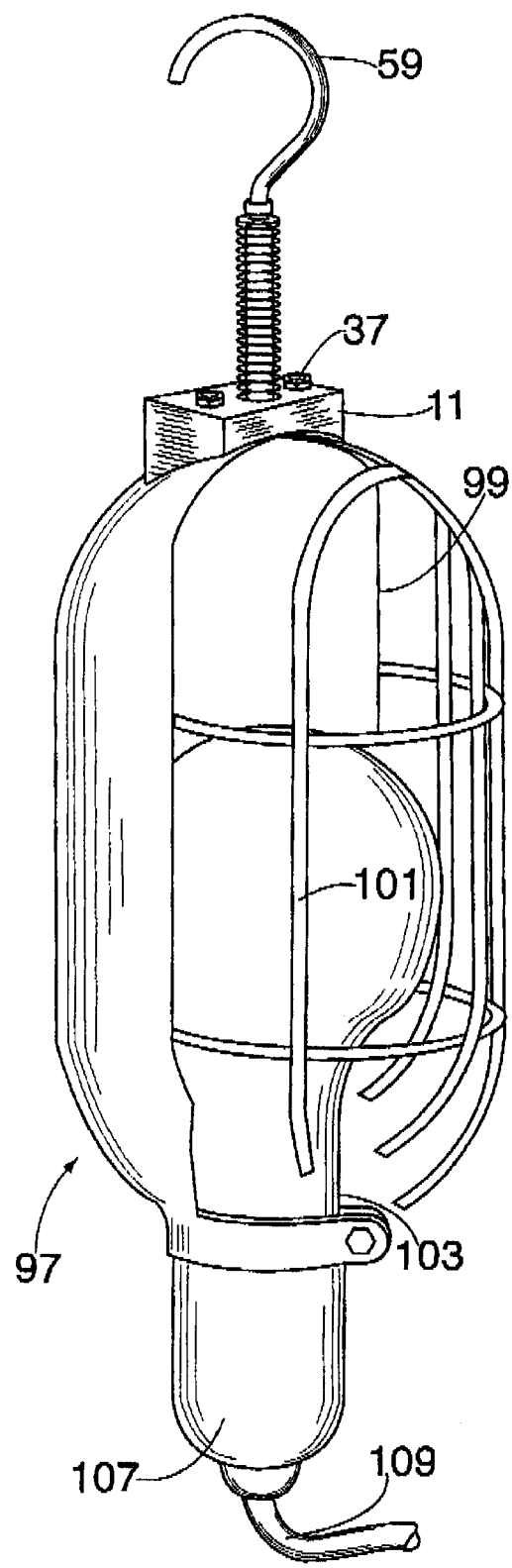
FIG. 11 is a perspective view of the Positioning Device mounted on a trouble light with the Positioning Device mounted on it.

As best seen in FIG. 11, the positioning device is readily mounted on a trouble light 97, which is just one of many items upon which it can be easily mounted. The trouble light is shown in a well-known standard form with a reflector 99 and a cage 101 which can be opened to replace a bulb 103. The bulb 103 is mounted in a standard socket (not shown) which is located in a handle 107 beneath the socket. The electrical cord 109 extends from the handle 107. If the trouble light 96 has a hook (not shown), that hook is preferably removed. The slope of the bottom surface 15 specifically adapts to the reflector 99. Fasteners 37 are used to hold the block 11 securely in place on the reflector 99.

It is to be understood that the drawings and descriptive matter are in all cases to be interpreted as merely illustrative of the principles of the invention, rather than as limiting the same in any way, since it is contemplated that various changes may be made to various elements to achieve like results without departing from the spirit of the invention or the scope of the appended claims.

What is claimed is:

1. A positioning device comprising:

a block having a top surface and a bottom surface, two end surfaces and a front surface and a rear surface, the block having an indentation in the bottom surface located generally equidistant between the two end surfaces and extending from the front surface to the rear surface and the block further having an inner surface within the indentation generally parallel with the top surface, the inner surface having at least two grooves, one extending from the front surface to the rear surface and the other generally at right angles thereto, the block further having an opening extending from the top surface to the inner surface and into the grooves and having two holes located generally midway between the front surface and the rear surface, and generally equally spaced on opposite sides of the opening, the grooves having a generally semicircular cross section, the bottom surface being inclined in relation to the top surface;

a rod having a bar at one end, the bar being generally at right angles to the rod, the rod being threaded at the end opposite the bar and having a pair of slots about the rod, both slots being located toward the thread and being spaced from one another, the rod being mounted in the opening to slide in the opening, the bar having a semicircular cross section substantially the same as the grooves in the inner surface;

a coil spring mounted around the rod on the top surface;

a clip mounted in a slot on the rod, the spring being compressed between the block and the clip;

a coupling mounted on the thread of the rod;

a fastening means mounted in the coupling;

a bracket for mounting the block, the bracket having an L-shape with a plate member and a mounting member, the mounting member extending generally at right angles to the plate member, the plate member including a pair of holes remote from the mounting member and a pair of holes through the mounting member, the mounting member having an outer surface, the outer surface being inclined in relation to the plate member at substantially the same angle as the bottom surface is inclined in relation to the top surface; and bolt means extending through the holes in the block and the mounting member, the bottom surface of the block being secured to the outer surface of the bracket.

2. A positioning device comprising:

a block having a top surface and a bottom surface, the block having an indentation in the bottom surface, the block having an inner surface within the indentation generally parallel with the top surface, the inner surface having at least two grooves at right angles to one another, the block further having an opening extending from the top surface to the inner surface and into the grooves;

a rod having a bar at one end, the bar being generally at right angles to the rod, the rod having at least one slot about the rod near the end of the rod opposite from the bar, the rod being mounted in the opening to slide in the opening, the bar having a cross section substantially the same as the grooves in the inner surface of the indentation;

a spring mounted around the rod;

a clip mounted in the slot on the rod, the spring being compressed between the block and the clip;

a fastening means; and means for securing the fastening means to the rod.

3. A positioning device according to claim 2 further including:

a bracket with two ends for mounting the block, the bracket having a mounting member at one end, the mounting member having a mounting surface; and means for securing the block to the mounting surface with the rod extending away from the mounting member.

4. A positioning device comprising:

a block having a top surface and a bottom surface, two end surfaces and a front surface and a rear surface, the block having an indentation in the bottom surface located generally equidistant between the two end surfaces and extending from the front surface to the rear surface and the block further having an inner surface within the indentation generally parallel with the top surface, the inner surface having at least two grooves, one extending from the front surface to the rear surface and the other generally at right angles thereto, the block further having an opening extending from the top surface to the inner surface and into the grooves, the grooves having a generally semicircular cross section;

a rod having a bar at one end, the bar being generally at right angles to the rod, the rod being mounted in the opening to slide in the opening, the bar having a semicircular cross section substantially the same as the grooves in the inner surface;

a coil spring mounted around the rod on the top surface;

a clip mounted on the rod, the spring being compressed between the block and the clip; and a fastening means mounted on the rod at the end of the rod opposite from the bar.

5. A positioning device according the claim 4, wherein the block further includes two holes located generally midway between the front surface and the rear surface and generally equally spaced on opposite sides of the opening.

6. A positioning device according to claim 4 wherein the bottom surface is inclined in relation to the top surface.

7. A positioning device according to claim 4 wherein:

the rod is threaded at the end opposite from the bar;

a coupling is mounted on the thread on the rod; and the fastening means is mounted in the coupling.

8. A positioning device according to claim 4 further including:

a bracket for mounting the block, the bracket having an L-shape with a plate member and a mounting member, the mounting member extending generally at right angles to the plate member, the plate member including a pair of holes remote from the mounting member and a pair of holes through the mounting member, the mounting member having an outer surface.

9. A positioning device according to claim 4 further including:

a bracket for mounting the block, the bracket having an L-shape with a plate member and a mounting member, the mounting member extending generally at right angles to the plate member, the plate member including a pair of holes remote from the mounting member and a pair of holes through the mounting member, the mounting member having an outer surface, the outer surface being inclined in relation to the plate member at substantially the same angle as the bottom surface is inclined in relation to the top surface.

10. A block positioning device according to claim 4 further including:

a bracket for mounting the block, the bracket having an L-shape with a plate member and a mounting member, the mounting member extending generally at right angles to the plate member, the plate member including a pair of holes remote from the mounting member and a pair of holes through the mounting member, the mounting member having an outer surface, the outer surface being inclined in relation to the plate member at substantially the same angle as the bottom surface is inclined in relation to the top surface; and bolt means extending through the holes in the block and the mounting member, the bottom surface of the block being secured to the outer surface of the bracket.

* * * * *